(12) United States Patent
Hazazi et al.

(10) Patent No.: US 12,473,811 B2
(45) Date of Patent: Nov. 18, 2025

(54) VALIDATION AND OPTIMIZATION OF INDUSTRIAL CARBON FOOTPRINT EMISSIONS REDUCTION

(71) Applicant: Saudi Arabian Oil Company, Dhahran (SA)

(72) Inventors: Abdulrahman M. Hazazi, Dammam (SA); Zyad Abood Bamigdad, Dammam (SA); Mana M. Alowaidh, Dhahran (SA); Ali H. Al-Qahtani, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 263 days.

(21) Appl. No.: 17/967,362

(22) Filed: Oct. 17, 2022

(65) Prior Publication Data

US 2024/0127155 A1    Apr. 18, 2024

(51) Int. Cl.
*E21B 44/00*    (2006.01)
*E21B 41/00*    (2006.01)
*G06Q 10/0637*    (2023.01)
*G06Q 50/26*    (2012.01)

(52) U.S. Cl.
CPC .......... *E21B 44/00* (2013.01); *E21B 41/0064* (2013.01); *G06Q 10/0637* (2013.01); *G06Q 50/26* (2013.01); *Y02E 20/32* (2013.01)

(58) Field of Classification Search
USPC ........ 175/61, 67, 11, 16, 206, 210; 408/705, 408/9, 12
See application file for complete search history.

(56) References Cited

U.S. PATENT DOCUMENTS 7,877,235 B2 *   1/2011   McConnell ........ G06Q 10/0639
                                                     705/500
10,125,641 B2 *  11/2018  Sundaram ............. E21B 43/164
(Continued)

FOREIGN PATENT DOCUMENTS

CN    114282736    4/2022
EP    1521152      4/2005
EP    3731159      10/2020

OTHER PUBLICATIONS

Vogt-Schilb, Adrien, Guy Meunier, and Stéephane Hallegatte. "When starting with the most expensive option makes sense: Optimal timing, cost and sectoral allocation of abatement investment." Journal of Environmental Economics and Management 88 (2018): 210-233. (Year: 2018).*

(Continued)

*Primary Examiner* — Gurkanwaljit Singh
(74) *Attorney, Agent, or Firm* — Fish & Richardson P.C.

(57) ABSTRACT

Systems and methods include a method for generating optimum de-carbonization investment plans. An optimization objective is determined for reducing carbon dioxide ($CO_2$) emissions of an organization. A $CO_2$ emissions baseline for the organization is determined. An optimum de-carbonization investment plan is generated for the organization using the optimization objective and the $CO_2$ emissions baseline for the organization. The optimum de-carbonization investment plan is configured to minimize life cycle costs of the organization while meeting emission reduction targets of the organization.

20 Claims, 5 Drawing Sheets

(56) References Cited

U.S. PATENT DOCUMENTS

| | | | | |
|---|---|---|---|---|
| 2009/0287520 | A1* | 11/2009 | Zimmerman | G06Q 10/04 |
| | | | | 707/999.107 |
| 2010/0257124 | A1* | 10/2010 | Srinivasan | G06Q 10/06 |
| | | | | 705/348 |
| 2012/0084193 | A1* | 4/2012 | Marino | G06Q 40/04 |
| | | | | 705/37 |
| 2013/0035973 | A1* | 2/2013 | Desai | G06Q 10/06 |
| | | | | 705/7.11 |
| 2014/0039709 | A1* | 2/2014 | Steven | H02J 13/00034 |
| | | | | 700/291 |
| 2014/0039965 | A1* | 2/2014 | Steven | G06Q 10/06315 |
| | | | | 705/7.25 |
| 2017/0138222 | A1* | 5/2017 | Sundaram | F01K 7/16 |
| 2018/0134593 | A1* | 5/2018 | Remer | C02F 7/00 |
| 2020/0256181 | A1* | 8/2020 | Jamieson | E21B 7/00 |
| 2020/0370446 | A1* | 11/2020 | Mook | F02G 1/044 |
| 2021/0388717 | A1* | 12/2021 | Srinivasan | E21B 44/00 |
| 2022/0109175 | A1* | 4/2022 | Allinson | C01B 3/0015 |
| 2022/0413166 | A1* | 12/2022 | Saccomanno | G01T 1/02 |
| 2023/0020417 | A1* | 1/2023 | Elbsat | G06Q 10/06313 |

OTHER PUBLICATIONS

Ioannou, Ioannis, Shelley Xin Li, and George Serafeim. "The effect of target difficulty on target completion: The case of reducing carbon emissions." The Accounting Review 91.5 (2016): 1467-1492. (Year: 2016).*

Dahlmann, Frederik, Layla Branicki, and Stephen Brammer. "Managing Carbon Aspirations: The Influence of Corporate Climate Change Targets on Environmental Performance." Journal of Business Ethics (2019): 1-24. (Year: 2019).*

Vogt-Schilb, Adrien, Guy Meunier, and Stéphane Hallegatte. "When starting with the most expensive option makes sense: Optimal timing, cost and sectoral allocation of abatement investment." Journal of Environmental Economics and Management 88 (2018): 210-233. (Year: 2018).*

Wang, Yongli, et al. "Capacity planning and optimization of business park-level integrated energy system based on investment constraints." Energy 189 (2019): 116345. (Year: 2019).*

Josifović, Aleksandar. "Reducing the environmental impact of hydraulic fracturing pumps." (2016). (Year: 2016).*

"A Corporate Accounting and Reporting Standard," The Greenhouse Gas Protocol, World Resources Institute and World Business Council for Sustainable Development, Mar. 2004, 116 pages.

Malins et al., "Reduction of Upstream Greenhouse Gas Emissions from Flaring and Venting," International Council on Clean Transportation (ICCT), 2014, 246 pages.

Epa.gov [online] "Scope 3 Inventory Guidance," EPA Center for Corporate Climate Leadership, available on or before Nov. 27, 2006, via Internet Archive: Wayback Machine URL <http://web.archive.org/web/20161127162705/https://www.epa.gov/climateleadership/scope-3-inventory-guidance>, retrieved on Apr. 18, 2023, retrieved from URL <https://www.epa.gov/climateleadership/scope-3-inventory-guidance>, 13 pages.

"Technical Guidance for Calculating Scope 3 Emissions," Greenhouse Gas Protocol, World Resources Institute & World Business Council for Sustainable Development, 2013, 182 pages.

* cited by examiner

VALIDATION AND OPTIMIZATION OF INDUSTRIAL CARBON FOOTPRINT EMISSIONS REDUCTION

TECHNICAL FIELD

The present disclosure applies to techniques for reducing an organization's carbon footprint.

BACKGROUND

Carbon footprint estimation is an essential element for establishing de-carbonization strategies for an organization. Commonly used carbon footprint estimation methodologies are typically based on high-level estimations without focusing on the highest contributors of carbon dioxide ($CO_2$) emissions.

SUMMARY

The present disclosure describes techniques that can be used for the optimization of industrial carbon footprint emissions reductions. In some implementations, a computer-implemented method includes the following. An optimization objective is determined for reducing carbon dioxide ($CO_2$) emissions of an organization. A $CO_2$ emissions baseline for the organization is determined. An optimum de-carbonization investment plan is generated for the organization using the optimization objective and the $CO_2$ emissions baseline for the organization. The optimum de-carbonization investment plan is configured to minimize life cycle costs of the organization while meeting emission reduction targets of the organization.

The previously described implementation is implementable using a computer-implemented method; a non-transitory, computer-readable medium storing computer-readable instructions to perform the computer-implemented method; and a computer-implemented system including a computer memory interoperable coupled with a hardware processor configured to perform the computer-implemented method, the instructions stored on the non-transitory, computer-readable medium.

The subject matter described in this specification can be implemented in particular implementations and applications, so as to realize one or more of the following advantages. Using techniques of the present disclosure can lead to more accurate estimates of $CO_2$ emissions and can enable an organization to optimize its efforts in mitigating the highest $CO_2$ contributors. For example, optimization can refer to reducing $CO_2$ contributors by a predefined threshold, such as by a percentage, cost, and other related indices. The techniques can include the use of an optimization layer, typically absent from conventional systems in the area of identifying $CO_2$ emissions. The techniques can be used for potential reductions in optimized plans of de-carbonization projects.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
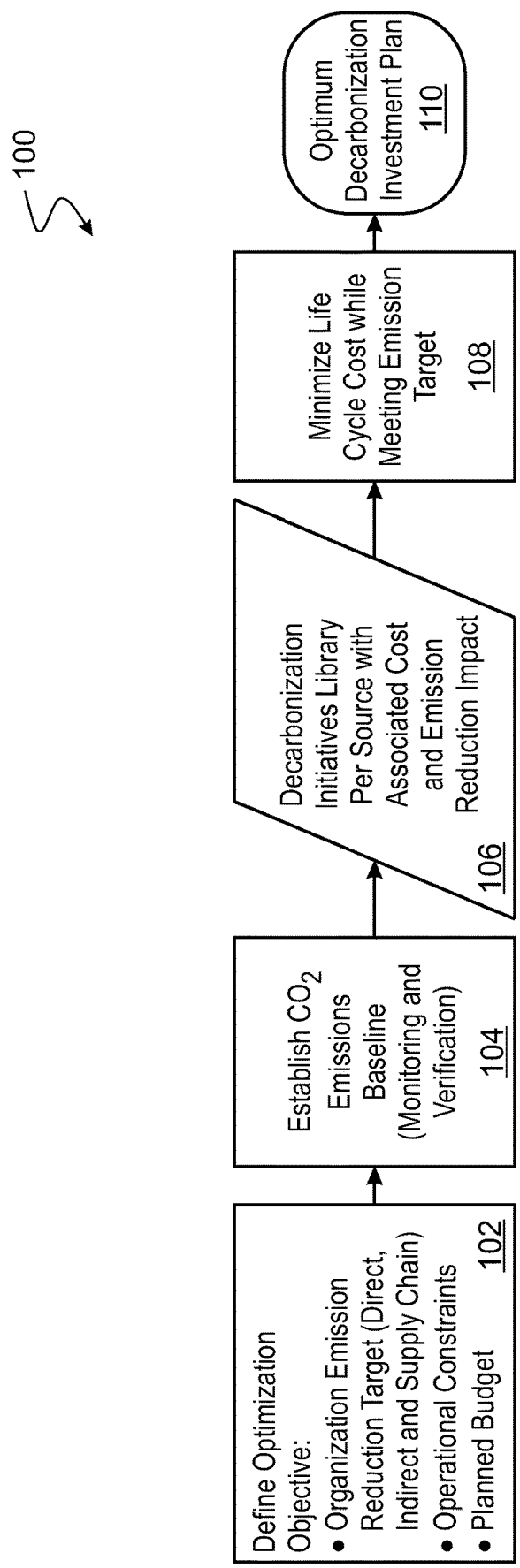
FIG. 1 is a block diagram showing an example of a structure used for optimization, according to some implementations of the present disclosure.

The following detailed description describes techniques for the optimization of industrial carbon footprint emissions reductions. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Techniques of the present disclosure can use at least two main functions. The functions include a monitoring and validation function and an optimization function.

Monitoring and Validation Function

Methodologies of the present disclosure provide a framework that can be used to accurately estimate an organization's emissions and allow for better targeting of carbon dioxide ($CO_2$) emissions reduction opportunities.

Methodologies used to estimate the emissions have multiple parameters, including instrument readings, product types, amounts consumed by end-users, geographical location, and other variables. By considering all the aforementioned parameters, the methodologies can yield results that are almost identical when compared to actual emissions determined from multiple random case studies conducted to prove the efficacy of this framework.

The $CO_2$ emissions monitoring can include monitoring direct emissions, indirect emissions, and emissions resulting from supply chains. As such, the methodologies can provide estimates of an organization's direct, indirect, and supply chain $CO_2$ emissions. The emissions can be classified based on combustion, venting, flaring, and fugitives for direct and indirect emissions. Classification of emissions can also be done for the supply chain based on geography (e.g., continent, country, or other location), business sector, and customer level.

Optimization Function

The present disclosure includes an optimization layer for: 1) identifying maximum $CO_2$ emissions reduction opportunities within a given budget constraint per year, and 2)

prioritizing investments to meet required targets for an organization. The optimization layer can include: 1) an objective function defining a maximum $CO_2$ emissions reduction; 2) constraints that define a budget constraint per year or per a given time period, and $CO_2$ emissions reduction target; and 3) variables defining (e.g., on a binary basis) selected opportunities and technologies per customer, sector, and/or organization.

Formulations can be based on a well-structured library for de-carbonization opportunities including flare minimization, energy efficiency, low-carbon energy, carbon capturing, offsetting, and renewables opportunities. Problem formulations can also be based on a library of de-carbonization technologies associated with capital costs, operating costs, and the economic parameters for life cycle cost analysis. The flow chart of FIG. 1 illustrates optimization.

FIG. 1 is a block diagram showing an example of a structure 100 used for optimization, according to some implementations of the present disclosure. The structure 100 can serve as a workflow for generating an optimum de-carbonization investment plan. Methodologies of the present disclosure provide the ability to monitor $CO_2$ emissions and develop optimized $CO_2$ emissions reduction plans. The methodologies can use different functions for analysis, starting from simple calculations to more advanced analytics tools, such as an optimization function and machine learning. Components of the structure can occur simultaneously.

A monitoring structure can provide a solution developed using the discussed methodology which relies on several data sources to calculate and visualize an organization's carbon footprint. Thousands of data points can be used in a solution that includes real-time data, historical data, and design data.

Figure 2:
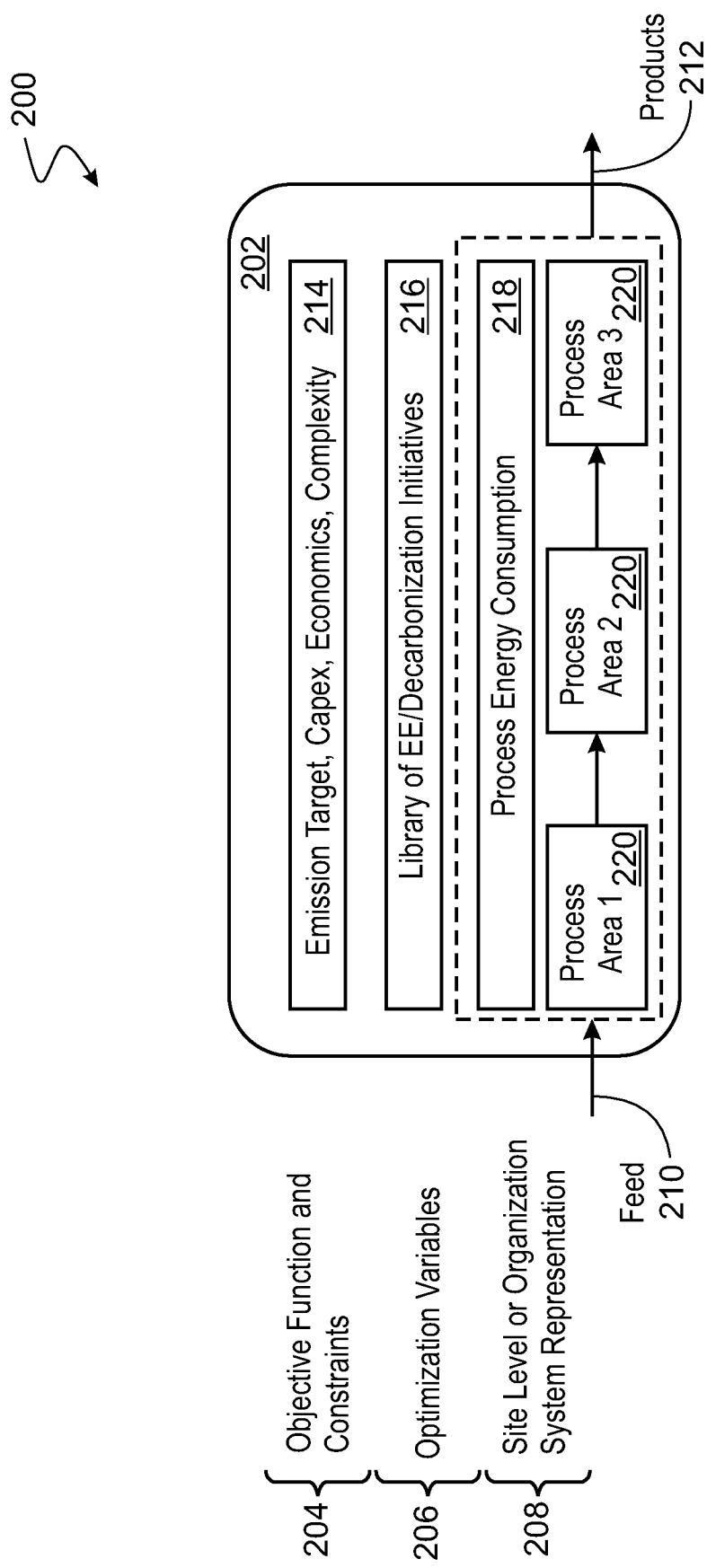
FIG. 2 is a block diagram showing an example of a de-carbonization system according to some implementations of the present disclosure.

Optimization structures of the techniques of the present disclosure can enable the organization to optimize a de-carbonization plan based on selected emissions types. Optimization methodologies can include high-level structures and major components as shown in FIG. 2.

Referring to the structure 100, at 102, an optimization objective is defined. For example, defining the optimization objective for reducing $CO_2$ emissions of the organization can include: 1) determining the emission reduction targets of the organization; 2) determining operational constraints for meeting the emission reduction targets, and determining a planned budget by which to meet the optimization objective while operating under the operational constraints. The emission reduction targets can include a direct emissions reduction target, an indirect emissions reduction target, and a supply chain emissions reduction target. Determining the optimization objective for reducing $CO_2$ emissions of the organization can include using a library of information regarding energy efficiency (EE) de-carbonization initiatives that define for each type of source used by organizations, costs, and impacts associated with each type of emission reduction.

At 104, a $CO_2$ emissions baseline is established. As an example, establishing the $CO_2$ emissions baseline for the organization can include monitoring and verifying direct emissions, indirect emissions, and emissions resulting from supply chains; and classifying the $CO_2$ emissions based on combustion, venting, flaring, and fugitives for direct and indirect emissions.

At 106, a de-carbonization initiatives library is accessed on a per source basis with associated cost and emission reduction impacts. The de-carbonization initiatives library can include a combination of local data and data available through the network (e.g., including the Internet) from one or more sources.

At 108, life cycle costs are minimized while meeting emission targets. For example, processes and/or algorithms can be used that are designed to reduce life cycle costs while still allowing emissions to be reduced, such as by maximizing return on investment (ROI).

At 110, an optimum de-carbonization investment plan is generated. For example, the optimum de-carbonization investment plan can include amounts of investment to be made in specific areas/resources at specific times.

FIG. 2 is a block diagram showing an example of a de-carbonization system 200 according to some implementations of the present disclosure. A de-carbonization function 202 uses inputs 204, 206, and 208 as a feed 210 to produce products 212, such as the optimum de-carbonization investment plan described with reference to FIG. 1. The de-carbonization function 202 uses inputs 214 including an emission target, CAPEX information, economics information and a complexity of the organization's emissions. The de-carbonization function 202 also uses a library of EE/de-carbonization initiatives 216. The de-carbonization function 202 makes use of process energy consumption information 218 for multiple process areas 220.

Application of Techniques

Techniques of the present disclosure can be applied at an organization level as well as a site level. During development and testing, the techniques were applied to a conventional gas turbine power plant.

Figure 3:
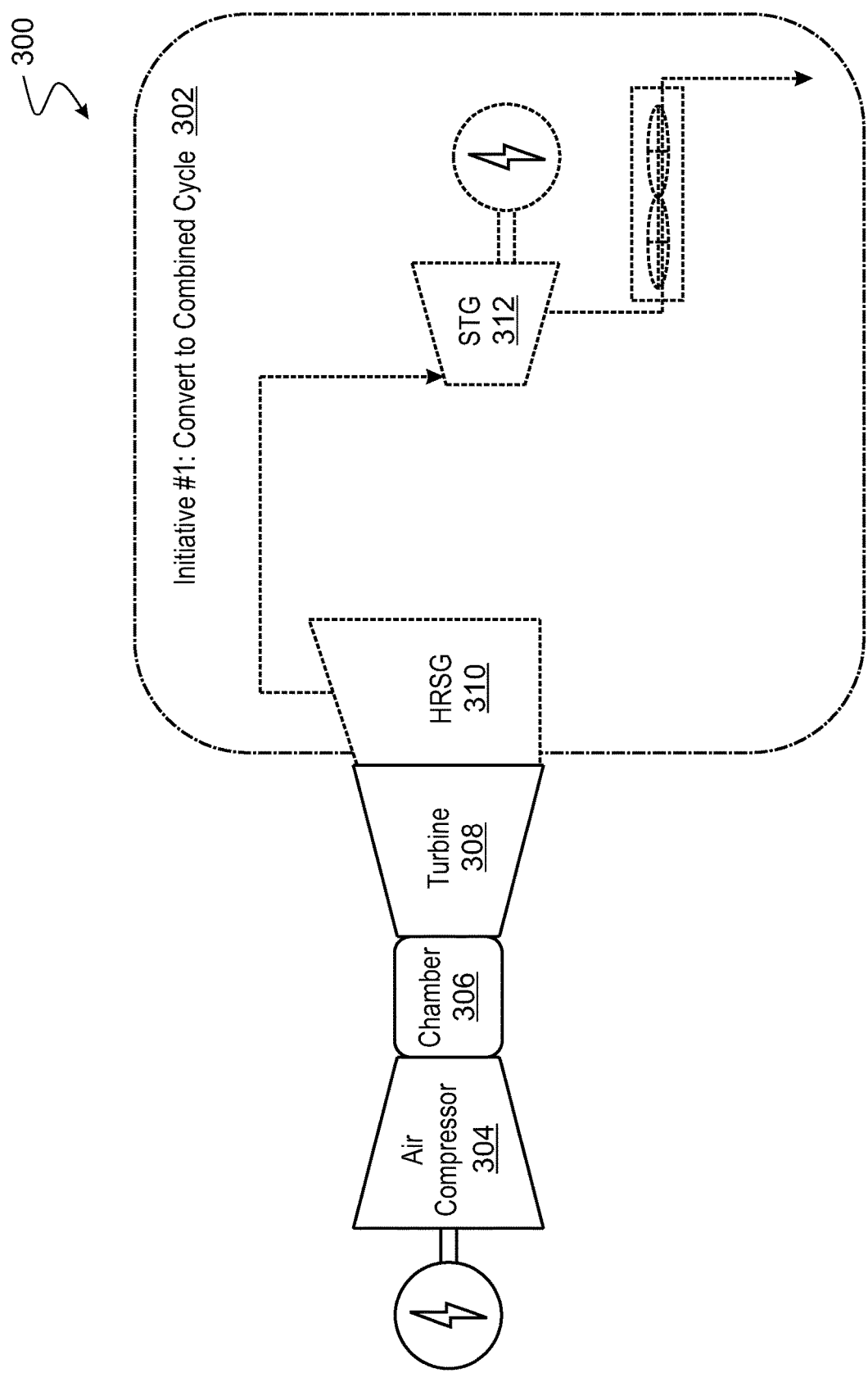
FIG. 3 is a diagram of an example of a system for energy recovery, according to some implementations of the present disclosure.

FIG. 3 is a diagram of an example of a system 300 for energy recovery, according to some implementations of the present disclosure. The example in the system 300 includes an initiative 302 for converting to a combined cycle. The process includes the use of an air compressor 304, a chamber 306, a turbine 308, a heat recovery steam generator (HRSG) 310, and a steam turbine generator (STG) 312. The system 300 can be part of an organization's plan for de-carbonization.

A data library used in optimizing the de-carbonization plan can include the capital cost, operating parameters, $CO_2$ emission related factors, and net present values. In the example of the present disclosure, a $CO_2$ emissions reduction target of 1450 kilotons per year (k ton/yr) was set to be achieved by 2050. The $CO_2$ emissions reduction initiatives and their related parameters are listed in the below table, including, for each initiative, CAPEX,

TABLE 1

Impacts by Initiative

| Initiatives | Impact Summary | | | | |
| --- | --- | --- | --- | --- | --- |
| | Capex, millions of dollars (MM$) | Fuel Consumption (MMBtu/h) | Power (MW) | Red. CO2 Emission, K Ton/Yr | NPV, MM$ |
| Convert to combined cycle | 250 | 0 | 200 | 1270 | 500 |
| Inlet air cooling | 5 | 193 | 30 | 97 | 100 |
| CCUS | 200 | 0 | −10 | 2200 | −200 |
| ISCC | 90 | −100 | 30 | 227 | 20 |
| Initiative -5 | — | — | — | — | — |
| Initiative -6 | — | — | — | — | — |
| Initiative -7 | — | — | — | — | — |
| Initiative -8 | — | — | — | — | — |

TABLE 1-continued

Impacts by Initiative

| | Impact Summary | | | | |
|---|---|---|---|---|---|
| Initiatives | Capex, millions of dollars (MM$) | Fuel Consumption (MMBtu/h) | Power (MW) | Red. CO2 Emission, K Ton/Yr | NPV, MM$ |
| Initiative -9 | — | — | — | — | — |
| Initiative -10 | — | — | — | — | — |

The allocated budgets per period are defined in below table.

TABLE 2

Budgets by 5-year Period

| | Year | | | | | |
|---|---|---|---|---|---|---|
| | 2025 | 2030 | 2035 | 2040 | 2045 | 2050 |
| Allocated Budget, MM $ | 0 | 100 | 150 | 300 | 150 | 200 |

Optimization Layer

The optimization layer can use an objective function, constraints, and variables. The objective function can serve, for example, as a goal of optimization, such as having flexibility to be a goal to: 1) maximize net present value (NPV), 2) minimize capital expenditures (CAPEX), or 3) maximize $CO_2$ emissions reduction. The constraints can include quantitative values, such as budget constraints per year or per a given period, and a $CO_2$ emissions reduction target. Variables can be a binary selection of specific energy efficiency and de-carbonization initiatives per process area, customer, sector, or organization. In an example, two objective functions were tested to generate a de-carbonization roadmap which are to maximize NPV and minimize CAPEX.

Results

The results of two cases are illustrated using the following four tables. Each case includes a table including a de-carbonization and a table for a summary. The cases can be compared by comparing Table 3 versus Table 5, and Table 4 versus Table 6.

In a first case, a de-carbonization plan is based on maximum NPV. Table 1 identifies a timeline by year for completing specific initiatives. Table 2 provides a summary, including costs and emission reductions.

TABLE 3

Case 1 Plan

| | Year | | | | | |
|---|---|---|---|---|---|---|
| Initiatives | 2025 | 2030 | 2035 | 2040 | 2045 | 2050 |
| Convert to combined cycle | | | | x | | |
| Inlet air cooling | | | | | | x |
| Carbon Capture, Utilization and Storage (CCUS) | | | | | | |
| International Sustainability and Carbon Certification (ISCC) | | x | | | | |

TABLE 4

Case 1 Summary

| | Year | | | | | | |
|---|---|---|---|---|---|---|---|
| Parameters | 2025 | 2030 | 2035 | 2040 | 2045 | 2050 | Total |
| CAPEX, MM $ | 0 | 90 | 0 | 250 | 0 | 5 | 345 |
| Non-Utilized Budget, MM $ | 0 | 10 | 150 | 50 | 150 | 195 | 555 |
| NPV, MM $ | 0 | 20 | 0 | 500 | 0 | 100 | 620 |
| Emission Reduction, K Ton/yr | 0 | 227 | 0 | 1270 | 0 | 97 | 1594 |

In a second case, a de-carbonization plan is based on minimum CAPEX. Table 3 identifies a timeline by year for completing specific initiatives. Table 4 provides a summary, including costs and emission reductions.

TABLE 5

Case 2 Plan

| | Year | | | | | |
|---|---|---|---|---|---|---|
| Initiatives | 2025 | 2030 | 2035 | 2040 | 2045 | 2050 |
| Convert to combined cycle | | | | | | |
| Inlet air cooling | | | | | | |
| CCUS | | | | x | | |
| ISCC | | | | | | |

TABLE 6

Case 2 Summary

| | Year | | | | | | |
|---|---|---|---|---|---|---|---|
| Parameters | 2025 | 2030 | 2035 | 2040 | 2045 | 2050 | Total |
| CAPEX MM $ | 0 | 0 | 0 | 200 | 0 | 0 | 200 |
| Non-Utilized Budget, MM $ | 0 | 100 | 150 | 100 | 150 | 200 | 695 |
| NPV, MM $ | 0 | 0 | 0 | −200 | 0 | 0 | −200 |
| Emission Reduction, K Ton/yr | 0 | 0 | 0 | 2200 | 0 | 0 | 2200 |

As indicated in the above example, the system enables the user to implement the best strategy to achieve de-carbonization targets according to user-defined objectives.

Therefore in the end step of the method of the invention, per the above embodiment, the site uses the system and reduces the $CO_2$ emissions, while maintaining the plant production, by accordingly converting the simple cycle into one or both of a combined cycle or by inlet air cooling. Such steps may optionally include further methods such as one or more of carbon capture, utilization, and storage (CCUS), and integrated solar combined cycle (ISCC).

Figure 4:
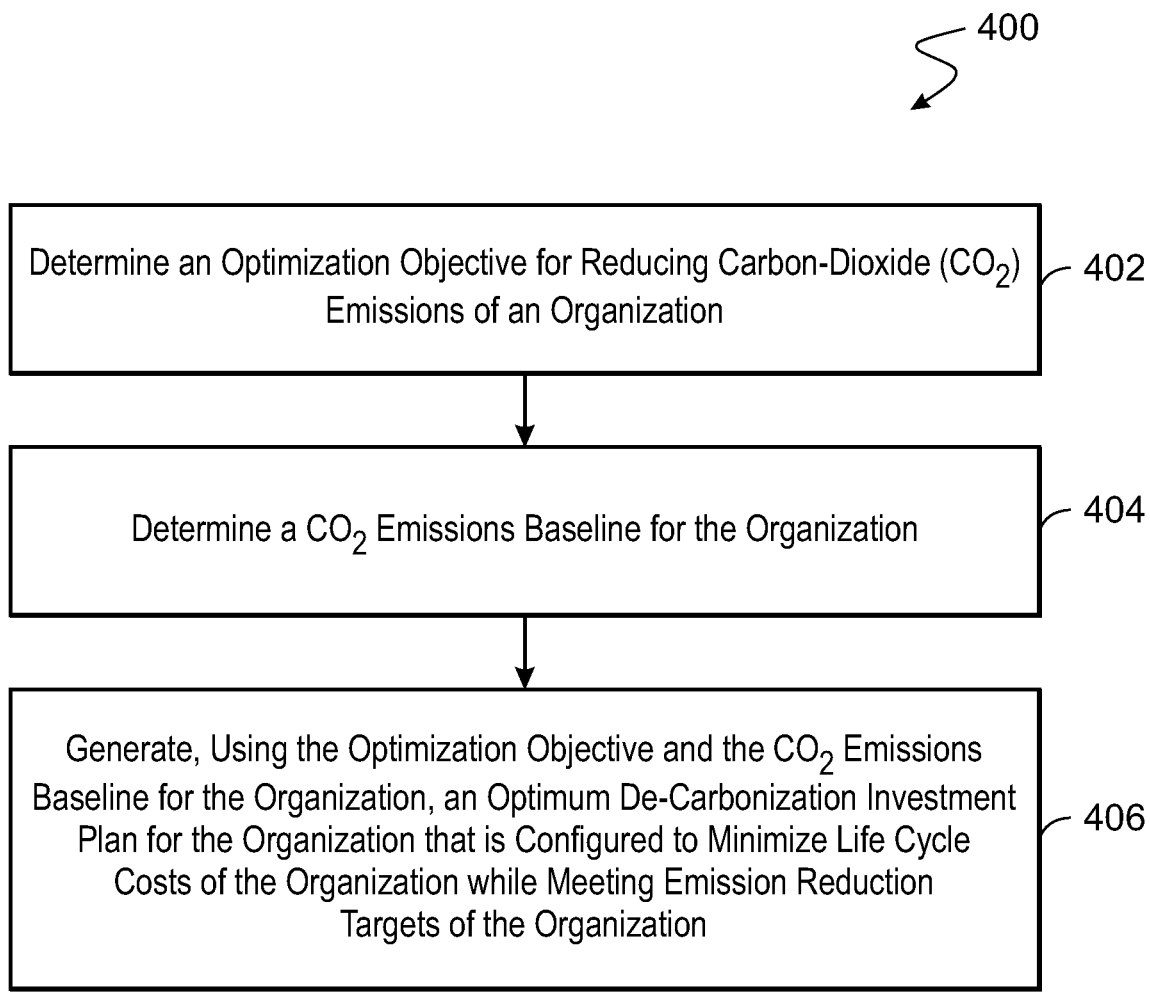
FIG. 4 is a flowchart of an example of a method for generating an optimum de-carbonization investment plan for an organization, according to some implementations of the present disclosure.

FIG. 4 is a flowchart of an example of a method 400 for generating an optimum de-carbonization investment plan for an organization, according to some implementations of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

At 402, an optimization objective for reducing carbon dioxide ($CO_2$) emissions of an organization is determined. In some implementations, determining the optimization objective for reducing $CO_2$ emissions of the organization can include: determining the emission reduction targets based on an objective function of the organization; determining operational constraints for meeting the emission reduction targets, and determining a planned budget by which to meet the optimization objective while operating under the operational constraints. The emission reduction targets of the organization can include a reduction of $CO_2$ contributors by a predefined threshold, e.g., as a percentage of $CO_2$ emissions. The objective function can be, for example, an optimization goal of maximizing net present value (NPV), minimizing capital expenditures (CAPEX), or maximizing $CO_2$ emissions reduction. The operational constraints can include quantitative values of a $CO_2$ emissions reduction target and budget constraints per one or both years and a given period. Determining the optimization objective for reducing $CO_2$ emissions of the organization includes using a library of information regarding energy efficiency (EE) de-carbonization initiatives that defines, for each type of source used by organizations, costs, and impacts associated with each type of emission reduction. From 402, method 400 proceeds to 404.

At 404, a $CO_2$ emissions baseline for the organization is determined. Determining the $CO_2$ emissions baseline for the organization can include, for example, monitoring and verifying direct emissions, indirect emissions, and emissions resulting from supply chains, and classifying the $CO_2$ emissions based on combustion, venting, flaring, and fugitives for direct and indirect emissions. From 404, method 400 proceeds to 406.

At 406, an optimum de-carbonization investment plan for the organization is generated using the optimization objective and the $CO_2$ emissions baseline for the organization. The optimum de-carbonization investment plan is configured to minimize the life cycle costs of the organization while meeting emissions reduction targets of the organization. As an example, the emission reduction targets of the organization can include a direct emissions reduction target, an indirect emissions reduction target, and a supply chain emissions reduction target. The optimization formulation is flexible so that a user can define different objective functions and key constraints.

In some implementations, generating the optimum de-carbonization investment plan for the organization can include prioritizing investments on a budget year basis to meet the emission reduction targets of the organization. Priorities that are output by an optimizer can be presented (e.g., in a user interface) to a user who can provide inputs representing decisions of whether the organization will implement particular investments or not. The user interface can present the prioritized investments with information regarding corresponding life cycle costs and information as to meeting emissions reduction targets. Upon selection of particular prioritized investments by the user, corresponding prioritized investments can be initiated, e.g., by providing a notification to managers that the investments be made. After 406, method 400 can stop.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, drilling parameters (including drill bit speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 5:
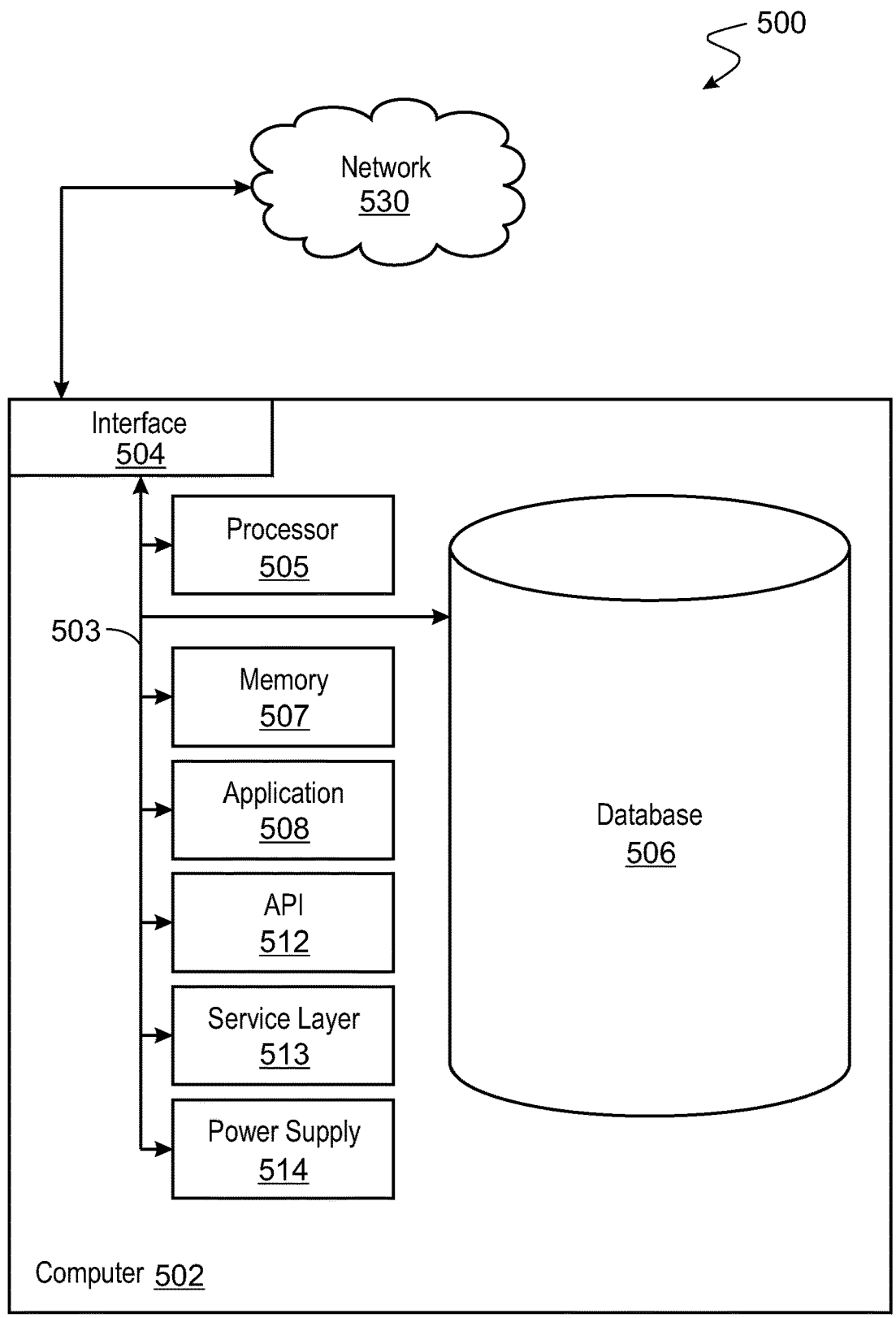
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power conversion and management circuits, including recharging, standby, and power management functionalities. In some implementations, the power supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes the following. An optimization objective is determined for reducing carbon dioxide ($CO_2$) emissions of an organization. A $CO_2$ emissions baseline for the organization is determined. An optimum de-carbonization investment plan is generated for the organization using the optimization objective and the $CO_2$ emissions baseline for the organization. The optimum de-carbonization investment plan is configured to minimize life cycle costs of the organization while meeting emission reduction targets of the organization.

The foregoing and other described implementations can each, optionally, include one or more of the following features:

A first feature, combinable with any of the following features, where determining the optimization objective for reducing $CO_2$ emissions of the organization includes: determining the emission reduction targets based on an objective function of the organization; determining operational constraints for meeting the emission reduction targets; and determining a planned budget by which to meet the optimization objective while operating under the operational constraints.

A second feature, combinable with any of the previous or following features, where the emission reduction targets of the organization include a direct emissions reduction target, an indirect emissions reduction target, and a supply chain emissions reduction target.

A third feature, combinable with any of the previous or following features, where determining the $CO_2$ emissions baseline for the organization includes: monitoring and verifying direct emissions, indirect emissions, and emissions resulting from supply chains; and classifying the $CO_2$ emissions based on combustion, venting, flaring, and fugitives for direct and indirect emissions.

A fourth feature, combinable with any of the previous or following features, where determining the optimization objective for reducing $CO_2$ emissions of the organization includes using a library of information regarding energy efficiency (EE) de-carbonization initiatives that defines, for each type of source used by organizations, costs, and impacts associated with each type of emission reduction.

A fifth feature, combinable with any of the previous or following features, where the emission reduction targets of the organization include a reduction of $CO_2$ contributors by a predefined threshold.

A sixth feature, combinable with any of the previous or following features, where the predefined threshold is a percentage of $CO_2$ emissions.

A seventh feature, combinable with any of the previous or following features, where the objective function includes an optimization goal of maximizing net present value (NPV).

An eighth feature, combinable with any of the previous or following features, where the objective function includes an optimization goal of minimizing capital expenditures (CAPEX).

A ninth feature, combinable with any of the previous or following features, where the objective function includes an optimization goal of maximizing $CO_2$ emissions reduction.

A tenth feature, combinable with any of the previous or following features, where the operational constraints include quantitative values of a $CO_2$ emissions reduction target and budget constraints per one or both of year and given period.

A eleventh feature, combinable with any of the previous or following features, where generating the optimum de-carbonization investment plan for the organization includes prioritizing investments on a budget year basis to meet the emission reduction targets of the organization.

A twelfth feature, combinable with any of the previous or following features, the method further including: optimizing, by an optimizer using the optimization objective and the $CO_2$ emissions baseline for the organization, investment priorities that are prioritized by the optimizer; presenting, in a user interface as part of the optimum de-carbonization investment plan, the investment priorities, including providing prioritized investments with information regarding corresponding life cycle costs and meeting emissions reduction targets; and receiving, through the user interface, inputs from a user representing decisions of whether the organization will implement particular prioritized investments or not In a second implementation, a computer-implemented system includes one or more processors and a non-transitory computer-readable storage medium coupled to the one or more processors and storing programming instructions for execution by the one or more processors. The programming instructions instruct the one or more processors to perform operations including the following. An optimization objective is determined for reducing carbon dioxide ($CO_2$) emissions of an organization. A $CO_2$ emissions baseline for the organization is determined. An optimum de-carbonization investment plan is generated for the organization using the optimization objective and the $CO_2$ emissions baseline for the organization. The optimum de-carbonization investment plan is configured to minimize life cycle costs of the organization while meeting emission reduction targets of the organization.

The foregoing and other described implementations can each, optionally, include one or more of the following features:

A first feature, combinable with any of the following features, where determining the optimization objective for reducing $CO_2$ emissions of the organization includes: determining the emission reduction targets based on an objective function of the organization; determining operational constraints for meeting the emission reduction targets; and determining a planned budget by which to meet the optimization objective while operating under the operational constraints.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of the exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
receiving, from a sensor, measurements indicative of carbon dioxide ($CO_2$) emissions of drilling equipment comprising a drill bit drilling a wellbore;
determining an optimization objective for reducing $CO_2$ emissions of an organization comprising the drilling equipment;
determining a $CO_2$ emissions baseline for the organization;
generating, using the optimization objective of the organization, the measurements indicative of the $CO_2$ emissions of the drilling equipment operating the drill bit, and the $CO_2$ emissions baseline for the organization, an optimum de-carbonization plan for the organization that is configured to minimize life cycle costs of the organization while meeting emission reduction targets of the organization;

generating, based on the optimum de-carbonization plan, changes to settings of the drill bit, the settings comprising one or more of a speed and a direction of the drill bit; and transmitting the changes to at least one of the speed and the direction of the drill bit to the drilling equipment.

2. The computer-implemented method of claim 1, wherein determining the optimization objective for reducing $CO_2$ emissions of the organization comprises:
   determining the emission reduction targets based on an objective function of the organization;
   determining operational constraints for meeting the emission reduction targets; and
   determining a plan by which to meet the optimization objective while operating under the operational constraints.

3. The computer-implemented method of claim 2, wherein the emission reduction targets of the organization comprise a direct emissions reduction target, an indirect emissions reduction target, and a supply chain emissions reduction target.

4. The computer-implemented method of claim 2, wherein determining the $CO_2$ emissions baseline for the organization comprises:
   monitoring and verifying direct emissions, indirect emissions, and emissions resulting from supply chains; and
   classifying the $CO_2$ emissions based on combustion, venting, flaring, and fugitives for direct and indirect emissions.

5. The computer-implemented method of claim 2, wherein determining the optimization objective for reducing $CO_2$ emissions of the organization comprises using a library of information regarding energy efficiency (EE) de-carbonization initiatives that defines, for each type of source used by organizations, costs, and impacts associated with each type of emission reduction.

6. The computer-implemented method of claim 2, wherein the emission reduction targets of the organization comprise a reduction of $CO_2$ contributors by a predefined threshold.

7. The computer-implemented method of claim 6, wherein the predefined threshold is a percentage of $CO_2$ emissions.

8. The computer-implemented method of claim 2, wherein the objective function comprises an optimization goal of maximizing net present value (NPV).

9. The computer-implemented method of claim 2, wherein the objective function comprises an optimization goal of minimizing capital expenditures (CAPEX).

10. The computer-implemented method of claim 2, wherein the objective function comprises an optimization goal of maximizing $CO_2$ emissions reduction.

11. The computer-implemented method of claim 2, wherein the operational constraints comprise quantitative values of a $CO_2$ emissions reduction target and constraints per one or both of year and given period.

12. The computer-implemented method of claim 1, wherein generating the optimum de-carbonization plan for the organization comprises prioritizing actions according to an annual plan to meet the emission reduction targets of the organization.

13. The computer-implemented method of claim 1, further comprising:
   optimizing, by an optimizer using the optimization objective and the $CO_2$ emissions baseline for the organization, priorities that are prioritized by the optimizer; and
   presenting, in a user interface as part of the optimum de-carbonization plan, the priorities, comprising information regarding emissions reduction targets.

14. The computer-implemented method of claim 1, further comprising:
   generating, based on the optimum de-carbonization plan, changes to settings of de-carbonization equipment of a conventional gas turbine power plant by activating an air compressor, controlling air to a chamber, changing a setting of a turbine, and activating a heat recovery steam generator and a steam turbine generator; and
   transmitting signals representing controlling activating the air compressor, controlling air to the chamber, changing the setting of a turbine, and activating the heat recovery steam generator and the steam turbine generator from a user interface to the air compressor, the chamber, the turbine, the heat recovery steam generator, or the steam turbine generator.

15. A system, comprising:
   drilling equipment comprising a drill bit configured to drill a wellbore;
   a sensor configured to detect carbon dioxide (CO2) emissions from the drilling equipment operating the drill bit; and
   a computer separate from the drilling equipment comprising:
      a dashboard configured to present $CO_2$ emissions related factors and settings of the drilling equipment to a user, at least one of the settings selectable by the user and comprising at least one of a speed or direction of the drill bit;
      one or more processors; and
      a non-transitory computer-readable storage medium coupled to the one or more processors and storing programming instructions for execution by the one or more processors, the programming instructions instructing the one or more processors to perform operations comprising:
         receiving, from the sensor, measurements indicative of carbon dioxide $CO_2$ emissions of the drilling equipment;
         determining an optimization objective for reducing $CO_2$ emissions of an organization comprising the drilling equipment;
         determining a $CO_2$ emissions baseline for the organization;
         generating, using the optimization objective of the organization, the measurements indicative of the $CO_2$ emissions of the drilling equipment, and the $CO_2$ emissions baseline for the organization, an optimum de-carbonization plan for the organization that is configured to minimize life cycle costs of the organization while meeting emission reduction targets of the organization;
         generating, based on the optimum de-carbonization plan, changes to the settings of the drilling equipment; and
         transmitting, based on user input to the dashboard, the changes of at least one of the speed or the direction of the drill bit from the dashboard to the drilling equipment.

16. The system of claim 15, the operations further comprising:
- determining the emission reduction targets based on an objective function of the organization; and
- determining operational constraints for meeting the emission reduction targets; and
- determining a plan by which to meet the optimization objective while operating under the operational constraints.

17. The system of claim 16, further comprising a conventional gas turbine power plant comprising:
- one or more of an air compressor, a turbine, a chamber between the air compressor and the turbine, a heat recovery steam generator, and a steam turbine generator; and
- a de-carbonization equipment,
- the programming instructions instructing the one or more processors to perform additional operations comprising:
  - generating, based on the optimum de-carbonization plan, changes to the settings of a de-carbonization equipment by activating the air compressor, controlling air to the chamber, setting the turbine, and activating the heat recovery steam generator and the steam turbine generator; and
  - transmitting, based on user input to the dashboard, the changes of at least one of the settings from the dashboard to the air compressor, the chamber, the turbine, the heat recovery steam generator, and the steam turbine generator.

18. The system of claim 17, wherein determining the optimization objective for reducing $CO_2$ emissions of the organization comprises:
- determining the emission reduction targets for the conventional gas turbine power plant based on the objective function of the organization;
- determining operational constraints of the conventional gas turbine power plant for meeting the emission reduction targets; and
- determining a plan by which to meet the optimization objective while operating under the operational constraints of the conventional gas turbine power plant.

19. The system of claim 15, wherein generating the optimum de-carbonization plan for the organization comprises prioritizing actions according to an annual plan to meet the emission reduction targets of the organization.

20. The system of claim 15, further comprising:
- optimizing, by an optimizer using the optimization objective and the $CO_2$ emissions baseline for the organization, priorities that are prioritized by the optimizer; and
- presenting, in a user interface as part of the optimum de-carbonization plan, the priorities, comprising information regarding emissions reduction targets.

* * * * *